US011107360B1

(12) United States Patent
Kimchi et al.

(10) Patent No.: US 11,107,360 B1
(45) Date of Patent: Aug. 31, 2021

(54) AUTOMATED AIR TRAFFIC CONTROL SYSTEMS AND METHODS

(71) Applicant: Amazon Technologies, Inc., Seattle, WA (US)

(72) Inventors: Gur Kimchi, Seattle, WA (US); Brian Beckman, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/553,677

(22) Filed: Aug. 28, 2019

(51) Int. Cl.
    *G08G 5/02* (2006.01)
    *G08G 5/06* (2006.01)
    *G08G 5/00* (2006.01)
    *G01S 13/91* (2006.01)

(52) U.S. Cl.
    CPC ............... *G08G 5/02* (2013.01); *G01S 13/91* (2013.01); *G01S 13/913* (2013.01); *G08G 5/0026* (2013.01); *G08G 5/0043* (2013.01); *G08G 5/06* (2013.01); *G01S 2013/916* (2013.01)

(58) Field of Classification Search
None
See application file for complete search history.

(56) References Cited

U.S. PATENT DOCUMENTS

| | | | | |
|---|---|---|---|---|
| 4,845,629 A * | 7/1989 | Murga | .................. | G08G 5/0026 701/120 |
| 4,999,780 A * | 3/1991 | Mitchell | ................ | G01C 23/00 340/972 |
| 5,164,734 A * | 11/1992 | Fredericks | ............ | G01S 7/4052 342/172 |
| 5,206,654 A * | 4/1993 | Finkelstein | ............... | G01S 1/14 342/410 |
| 5,351,054 A * | 9/1994 | Fredericks | ............ | G01S 7/4052 342/170 |
| 5,736,955 A * | 4/1998 | Roif | ...................... | G01S 13/935 342/33 |
| 6,850,185 B1 * | 2/2005 | Woodell | .................. | G01S 13/93 342/29 |
| 7,379,014 B1 * | 5/2008 | Woodell | ................. | G08G 5/065 342/29 |
| 7,855,675 B2 * | 12/2010 | Fouet | ................... | G08G 5/0021 342/33 |
| 8,457,812 B2 * | 6/2013 | Zammit-Mangion | ........................ | G08G 5/065 701/15 |

(Continued)

*Primary Examiner* — Fekadeselassie Girma
(74) *Attorney, Agent, or Firm* — Athorus, PLLC

(57) ABSTRACT

Automated air traffic control systems and methods may include one or more sensors, such as radar sensors, that are positioned and oriented at opposite ends of a runway. The sensors may detect aerial vehicles on the runway, as well as aerial vehicles within approach corridors at opposite ends of the runway, and other aerial vehicles proximate the runway. Based on data received by the sensors, various characteristics of aerial vehicles can be determined, and instructions for the aerial vehicles can be determined based on the detected characteristics. Then, the aerial vehicles may utilize the determined instructions to coordinate their operations proximate the runway, which may include takeoff, taxiing, and/or landing operations. Further, speech-to-data processing may be used to translate between data and speech or audio input/output in order to enable coordination between unmanned aerial vehicles, manned aerial vehicles, and combinations thereof.

20 Claims, 6 Drawing Sheets

(56) References Cited

U.S. PATENT DOCUMENTS

| | | | |
|---|---|---|---|
| 9,384,586 B1* | 7/2016 | McCusker | G08G 5/025 |
| 9,767,699 B1* | 9/2017 | Borghese | G08G 5/0026 |
| 10,228,460 B1* | 3/2019 | Jinkins | G01S 13/953 |
| 2002/0042673 A1* | 4/2002 | Ooga | G01S 7/04 |
| | | | 701/120 |
| 2004/0210847 A1* | 10/2004 | Berson | G01D 7/08 |
| | | | 715/788 |
| 2009/0212992 A1* | 8/2009 | Fouet | G08G 5/045 |
| | | | 342/38 |
| 2009/0284406 A1* | 11/2009 | Cornic | G01S 13/913 |
| | | | 342/33 |
| 2010/0023191 A1* | 1/2010 | Stefani | G08G 5/06 |
| | | | 701/21 |
| 2010/0085237 A1* | 4/2010 | Cornic | G01S 13/913 |
| | | | 342/33 |
| 2011/0187580 A1* | 8/2011 | Laenen | G01S 13/87 |
| | | | 342/29 |
| 2013/0261855 A1* | 10/2013 | DeGagne | G08G 5/0026 |
| | | | 701/16 |
| 2014/0088857 A1* | 3/2014 | Hollin, Jr. | G08G 5/0043 |
| | | | 701/120 |
| 2015/0194059 A1* | 7/2015 | Starr | G08G 5/0017 |
| | | | 701/3 |
| 2015/0302858 A1* | 10/2015 | Hearing | G01H 1/00 |
| | | | 381/58 |
| 2015/0316575 A1* | 11/2015 | Shams | G08G 5/0091 |
| | | | 73/170.13 |
| 2016/0131739 A1* | 5/2016 | Jinkins | G01S 13/953 |
| | | | 342/26 B |
| 2016/0272344 A1* | 9/2016 | Degagne | G08G 5/0021 |
| 2020/0189728 A1* | 6/2020 | Mackin | F16D 63/008 |
| 2020/0193159 A1* | 6/2020 | Sato | G06K 9/0063 |

* cited by examiner

AUTOMATED AIR TRAFFIC CONTROL SYSTEMS AND METHODS

BACKGROUND

Unmanned vehicles, such as unmanned aerial vehicles ("UAV"), are continuing to increase in use. With such increasing use, there is an increasing need for coordination and cooperation between manned aerial vehicles and unmanned aerial vehicles. For example, coordination and cooperation between manned and unmanned aerial vehicles is needed to enable safe and efficient operations at airfields, such as during takeoff, landing, and taxiing operations. Such coordination and cooperation may be particularly important for small, regional, and uncontrolled airfields. Accordingly, there is a need for automated systems and methods to facilitate coordination and cooperation between manned and unmanned aerial vehicles while ensuring safe and efficient operations at various types of airfields.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
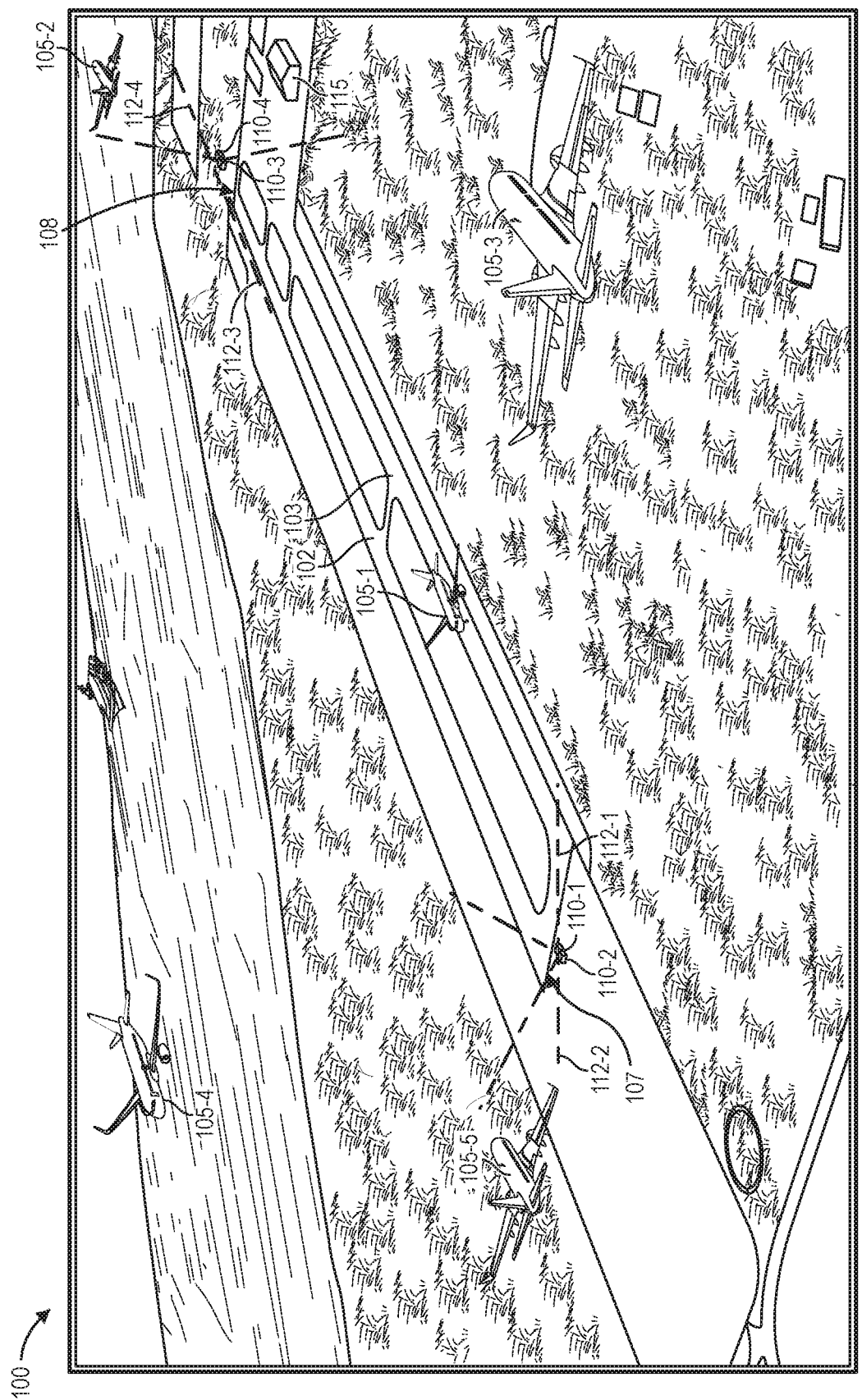
FIG. 1 is a schematic, perspective view diagram of an example automated air traffic control system, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein may relate to automated air traffic control systems to enable coordination and cooperation between unmanned aerial vehicles and manned aerial vehicles, and various combinations thereof.

In example embodiments, the automated air traffic control systems and methods described herein may be used in association with airports, airfields, airstrips, aerodromes, or similar locations at which unmanned aerial vehicles and manned aerial vehicles, and various combinations thereof, may benefit from coordination and cooperation of their various operations. For example, the automated air traffic control systems and methods described herein may facilitate and coordinate various operations, including takeoff operations, landing operations, taxiing operations, and various other operations of aerial vehicles at airports, airfields, airstrips, aerodromes, or similar locations.

In one example embodiment, the automated air traffic control system may include four radar sensors associated with a runway at an uncontrolled airfield. Generally, an uncontrolled airfield may not have an operational control tower to coordinate operations of aerial vehicles at the airfield. The four radar sensors of the automated air traffic control system may be placed at particular locations with respect to the runway, with two radar sensors positioned proximate a first end of the runway, and the other two radar sensors positioned proximate a second, opposite end of the runway.

For example, a first radar sensor at the first end of the runway may be oriented to emit electromagnetic or radio waves toward the runway, and a second radar sensor at the first end of the runway may be oriented to emit electromagnetic or radio waves toward a first approach corridor associated with the first end of the runway. Likewise, a third radar sensor at the second end of the runway may be oriented to emit electromagnetic or radio waves toward the runway, and a fourth radar sensor at the second end of the runway may be oriented to emit electromagnetic or radio waves toward a second approach corridor associated with the second end of the runway. In this manner, the first and third radar sensors may be oriented substantially towards or facing each other from opposite ends of the runway, and the second and fourth radar sensors may be oriented substantially away from the runway towards or facing opposite directions from each other.

As a result, aerial vehicles, whether manned or unmanned, that are proximate the first end of the runway of the uncontrolled airfield may be detected by at least the first radar sensor or the second radar sensor, and aerial vehicles, whether manned or unmanned, that are proximate the second end of the runway of the uncontrolled airfield may be detected by at least the third radar sensor or the fourth radar sensor. Further, aerial vehicles, whether manned or unmanned, that are on the runway of the uncontrolled airfield may be detected by at least the first radar sensor or the third radar sensor.

Upon detecting an aerial vehicle by at least one of the radar sensors of the automated air traffic control system, a controller may determine one or more characteristics of the aerial vehicle, such as identification, position, orientation, altitude, range or distance between an aerial vehicle and a runway or sensor, heading, speed, flight plan, remaining flight range, or other characteristics. The controller may also receive flight data from the aerial vehicle including one or more characteristics, such as identification, position, orientation, altitude, heading, speed, flight plan, remaining flight range, or other characteristics. Then, the controller may determine instruction data for the aerial vehicle based on the detected one or more characteristics of the aerial vehicle, such as identification, position, orientation, altitude, heading, speed, flight plan, flight pattern, turns, reroutes, delays, takeoff instructions, landing instructions, taxiing instructions, or other instructions. Further, the controller may transmit the instruction data to the aerial vehicle to control and coordinate operations of the aerial vehicle.

If the aerial vehicle is a manned aerial vehicle, the flight data received from the aerial vehicle may comprise audio flight information, e.g., audio input received from a pilot of the manned aerial vehicle. The controller may convert or translate the audio flight information to flight data, e.g., using a speech-to-data or speech-to-text processor, and the controller may determine one or more characteristics of the aerial vehicle, such as identification, position, orientation, altitude, range or distance between an aerial vehicle and a runway or sensor, heading, speed, flight plan, remaining flight range, or other characteristics. Then, the controller may determine instruction data for the aerial vehicle based on the detected one or more characteristics of the aerial vehicle, such as identification, position, orientation, altitude, heading, speed, flight plan, flight pattern, turns, reroutes, delays, takeoff instructions, landing instructions, taxiing instructions, or other instructions. Further, if the aerial vehicle is a manned aerial vehicle, the controller may convert or translate the instruction data to audio flight instructions, e.g., using a data-to-speech or text-to-speech processor, and the controller may transmit the audio flight instructions to the aerial vehicle, e.g., audio output provided to a pilot of the manned aerial vehicle, to control and coordinate operations of the aerial vehicle.

In further example embodiments, the automated air traffic control systems described herein may concurrently detect a plurality of aerial vehicles proximate a runway of an uncontrolled airfield. Based on sensor data received from the one or more radar sensors and/or flight data received from the plurality of aerial vehicles, a controller may determine instruction data for each of the plurality of aerial vehicles and transmit the instruction data to respective aerial vehicles in order to control and coordinate operations of the plurality of aerial vehicles proximate the runway of the uncontrolled airfield.

Using the automated air traffic control systems and methods described herein, small, regional, and/or uncontrolled airfields may ensure safe and efficient operations by improving coordination and cooperation between aerial vehicles at such airfields. In addition, various types of airports, airfields, airstrips, aerodromes, or similar locations may utilize the automated air traffic control systems and methods described herein to enable safe and efficient coordination and cooperation between various operations of both manned and unmanned aerial vehicles, and various combinations thereof.

FIG. 1 is a schematic, perspective view diagram of an example automated air traffic control system 100, in accordance with disclosed implementations.

As shown in FIG. 1, an airport, airfield, airstrip, aerodrome, or similar location, e.g., an uncontrolled airfield that does not include an operational control tower, may include one or more runways 102 and various taxiways 103. The runway 102 may extend along a particular direction, e.g., substantially along a magnetic azimuth, that may be chosen based on one or more prevailing winds at the airfield. Generally, aerial vehicles may take off and land into a direction of the prevailing wind, which may help generate additional lift at lower ground speeds. In addition, the runway 102 may include a first end 107 and a second, opposite end 108. As shown in FIG. 1, aerial vehicles are illustrated as taking off and landing in a direction that extends substantially from the bottom left corner of FIG. 1, e.g., near the first end 107, to the upper right corner of FIG. 1, e.g., near the second end 108, of the runway 102. The airfield may also include a terminal, hangar, or other building or structure 115 associated with the airfield.

At the first end 107 of the runway 102, two radar sensors 110-1, 110-2 may be positioned to detect aerial vehicles proximate the first end 107 of the runway 102. The first radar sensor 110-1 may have a field of view 112-1 that is oriented to emit electromagnetic or radio waves substantially toward a direction of the runway 102. In this manner, the first radar sensor 110-1 may detect aerial vehicles that are on the runway 102, e.g., aerial vehicles that are taking off from the runway 102, aerial vehicles that have landed on the runway 102, and/or aerial vehicles that are taxiing onto or off the runway 102. Further, the first radar sensor 110-1 may have a relatively wide field of view 112-1 in order to also detect aerial vehicles that are on the various taxiways 103. In this manner, the first radar sensor 110-1 may also detect aerial vehicles that are on the taxiway 103, e.g., aerial vehicles that are taxiing on the taxiway 103 before taking off from the runway 102, aerial vehicles that are taxiing on the taxiway 103 after landing on the runway 102, and/or aerial vehicles that are taxiing on the taxiway 103 to or from the terminal 115.

For example, as shown in FIG. 1, the first radar sensor 110-1 may detect a first aerial vehicle 105-1 that is on the taxiway 103. The first aerial vehicle 105-1 may be traveling along the taxiway 103 in preparation for takeoff from the runway 102.

The second radar sensor 110-2 may have a field of view 112-2 that is oriented to emit electromagnetic or radio waves substantially toward a first approach corridor associated with the first end 107 of the runway 102. In this manner, the second radar sensor 110-2 may detect aerial vehicles that are within the first approach corridor, e.g., aerial vehicles that have taken off from the runway 102, aerial vehicles that are approaching to land on the runway 102, and/or aerial vehicles that are flying proximate the first end 107 of the runway 102 after takeoff or in preparation for landing.

For example, as shown in FIG. 1, the second radar sensor 110-2 may detect a fifth aerial vehicle 105-5 that is within the first approach corridor associated with the first end 107 of the runway 102. The fifth aerial vehicle 105-5 may be approaching the runway 102 in preparation to land on the runway 102. In some example embodiments, depending on the field of view of the second radar sensor 110-2, a third aerial vehicle 105-3 and/or a fourth aerial vehicle 105-4 may also be detected by the second radar sensor 110-2 at various stages of their flights proximate the runway 102. The third and fourth aerial vehicles 105-3, 105-4 may be flying proximate the first end 107 of the runway 102 after takeoff or in preparation for landing. For example, to prepare for landing on the runway 102, aerial vehicles may be instructed to fly substantially around the runway 102, e.g., flying from a position near the third aerial vehicle 105-3 toward the second end 108 of the runway 102, turning and flying around the second end 108 of the runway 102, flying toward a position near the fourth aerial vehicle 105-4 and toward the first end 107 of the runway 102, turning around proximate the first end 107 of the runway 102, and flying toward a position near the fifth aerial vehicle 105-5 to approach and land along the first end 107 of the runway 102.

Likewise, at the second end 108 of the runway 102, two radar sensors 110-3, 110-4 may be positioned to detect aerial vehicles proximate the second end 108 of the runway 102. The third radar sensor 110-3 may have a field of view 112-3 that is oriented to emit electromagnetic or radio waves substantially toward a direction of the runway 102. In this manner, the third radar sensor 110-3 may detect aerial vehicles that are on the runway 102, e.g., aerial vehicles that are taking off from the runway 102, aerial vehicles that have landed on the runway 102, and/or aerial vehicles that are taxiing onto or off the runway 102. Further, the third radar sensor 110-3 may have a relatively wide field of view 112-3 in order to also detect aerial vehicles that are on the various taxiways 103. In this manner, the third radar sensor 110-3 may also detect aerial vehicles that are on the taxiway 103, e.g., aerial vehicles that are taxiing on the taxiway 103 before taking off from the runway 102, aerial vehicles that are taxiing on the taxiway 103 after landing on the runway 102, and/or aerial vehicles that are taxiing on the taxiway 103 to or from the terminal 115.

For example, as shown in FIG. 1, the third radar sensor 110-3 may also detect the first aerial vehicle 105-1 that is on the taxiway 103. The first aerial vehicle 105-1 may be traveling along the taxiway 103 in preparation for takeoff from the runway 102.

The fourth radar sensor 110-4 may have a field of view 112-4 that is oriented to emit electromagnetic or radio waves substantially toward a second approach corridor associated with the second end 108 of the runway 102. In this manner, the fourth radar sensor 110-4 may detect aerial vehicles that are within the second approach corridor, e.g., aerial vehicles that have taken off from the runway 102, aerial vehicles that are approaching to land on the runway 102, and/or aerial vehicles that are flying proximate the second end 108 of the runway 102 after takeoff or in preparation for landing.

For example, as shown in FIG. 1, the fourth radar sensor 110-4 may detect a second aerial vehicle 105-2 that is within the second approach corridor associated with the second end 108 of the runway 102. The second aerial vehicle 105-2 may have taken off from the second end 108 of the runway 102. In some example embodiments, depending on the field of view of the fourth radar sensor 110-4, the third aerial vehicle 105-3 and/or the fourth aerial vehicle 105-4 may also be detected by the fourth radar sensor 110-4 at various stages of their flights proximate the runway 102. The third and fourth aerial vehicles 105-3, 105-4 may be flying proximate the second end 108 of the runway 102 after takeoff or in preparation for landing. For example, to prepare for landing on the runway 102, aerial vehicles may be instructed to fly substantially around the runway 102, e.g., flying from a position near the third aerial vehicle 105-3 toward the second end 108 of the runway 102, turning and flying around the second end 108 of the runway 102, flying toward a position near the fourth aerial vehicle 105-4 and toward the first end 107 of the runway 102, turning around proximate the first end 107 of the runway 102, and flying toward a position near the fifth aerial vehicle 105-5 to approach and land along the first end 107 of the runway 102.

Each of the radar sensors 110 may comprise substantially single-lobe, focused radar sensors that may be relatively small, simple, and inexpensive in comparison to multi-lobe, large, and/or rotating radar sensors that may have very large, wide, and/or deep fields of view, which may generally be associated with or used by control towers of large, metropolitan, or commercial airports.

In addition, each of the radar sensors 110 may have various fields of view. For example, the first and third radar sensors 110-1, 110-3 that are oriented to emit electromagnetic or radio waves substantially toward a direction of the runway 102 and taxiways 103 may have sufficiently wide or horizontally large fields of view 112-1, 112-3 in order to detect any aerial vehicles on the runway 102 and/or taxiways 103 between the first end 107 and the second end 108 of the runway 102, but may have relatively short or vertically narrow fields of view 112-1, 112-3 in order to focus detection to aerial vehicles on the ground, e.g., on the runway 102 and/or taxiways 103.

Further, the second and fourth radar sensors 110-2, 110-4 that are oriented to emit electromagnetic or radio waves substantially toward respective approach corridors associated with respective ends 107, 108 of the runway 102 may have sufficiently wide or horizontally large fields of view 112-2, 112-4 in order to detect any aerial vehicles within the respective approach corridors at respective ends 107, 108 of the runway 102, and may also have sufficiently tall or vertically large fields of view 112-2, 112-4 in order to detect any aerial vehicles within the respective approach corridors at respective ends 107, 108 of the runway 102.

Using the automated air traffic control systems having radar sensors described herein, small, regional, and/or uncontrolled airfields may ensure safe and efficient operations by improving coordination and cooperation between aerial vehicles at such airfields. In addition, various types of airports, airfields, airstrips, aerodromes, or similar locations may utilize the automated air traffic control systems and methods described herein to enable safe and efficient coordination and cooperation between various operations of both manned and unmanned aerial vehicles, and various combinations thereof.

In some example embodiments, one or more of the radar sensors 110 may also be movable, adjustable, and/or rotatable in order to move, change, or sweep respective fields of view of the radar sensors 110. For example, one or more of the radar sensors 110 may detect an aerial vehicle proximate the runway 102, and respective fields of view of one or more of the radar sensors 110 may be moved, adjusted, and/or rotated to track and monitor the flight of the detected aerial vehicle, e.g., to facilitate safe and efficient landing on the runway 102.

In other example embodiments, instead of or in addition to one or more radar sensors 110 as described herein, the automated air traffic control systems described herein may utilize various other types of sensors to detect aerial vehicles proximate a runway of an airfield. For example, various other types of sensors may include LIDAR (light detection and ranging) sensors, imaging sensors, infrared sensors, acoustic sensors, or other types of sensors. Some types of sensors may have various advantages and/or disadvantages as compared to other types of sensors, e.g., accurate and/or precise detection of aerial vehicles in different weather or environmental conditions, reliable operation and function in various environments, different ranges or fields of view, different types of false positives or false negatives when detecting objects, different installation and/or operation costs, different maintenance expenses, different expected lifetimes, various types of failure modes, various types of processing techniques or algorithms and corresponding required processing power, and/or other various advantages or disadvantages. In further example embodiments, the automated air traffic control systems described herein may utilize various combinations of different types of sensors to detect aerial vehicles proximate a runway of an airfield, e.g., such as radar sensors and imaging sensors, radar sensors and LIDAR sensors, or various other combinations.

Figure 2:
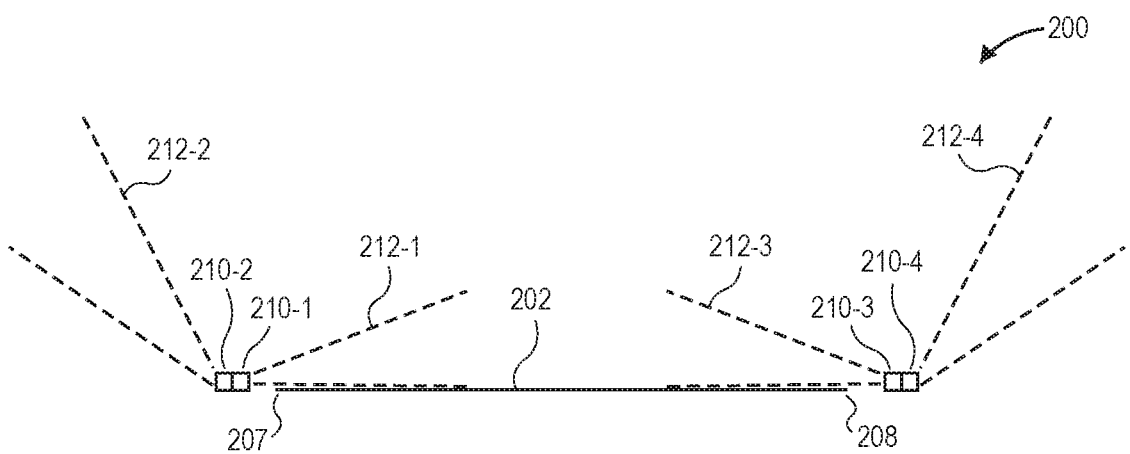
FIG. 2 is a schematic, side view diagram of an example automated air traffic control system, in accordance with disclosed implementations.

FIG. 2 is a schematic, side view diagram of an example automated air traffic control system 200, in accordance with disclosed implementations. The example automated air traffic control system 200 may be similar to the example automated air traffic control system 100 described with respect to FIG. 1. Various features described with respect to the example automated air traffic control system 100 of FIG. 1 may also be included in the example automated air traffic control system 200 of FIG. 2.

For example, as shown in FIG. 2, a runway 202 may extend between a first end 207 and a second, opposite end 208. Various taxiways (not shown) may be associated with and positioned around or near the runway 202.

At the first end 207 of the runway 202, two radar sensors 210-1, 210-2 may be positioned and oriented in particular directions to detect aerial vehicles proximate the first end 207 of the runway 202. The first radar sensor 210-1 may have a field of view 212-1 that is oriented to emit electromagnetic or radio waves substantially toward a direction of the runway 202. In this manner, the first radar sensor 210-1 may detect aerial vehicles that are on the runway 202, e.g., aerial vehicles that are taking off from the runway 202, aerial vehicles that have landed on the runway 202, and/or aerial vehicles that are taxiing onto or off the runway 202. Further, the first radar sensor 210-1 may have a relatively wide field of view 212-1 in order to also detect aerial vehicles that are on the various taxiways (not shown).

The second radar sensor 210-2 may have a field of view 212-2 that is oriented to emit electromagnetic or radio waves substantially toward a first approach corridor associated with the first end 207 of the runway 202. In this manner, the second radar sensor 210-2 may detect aerial vehicles that are within the first approach corridor, e.g., aerial vehicles that have taken off from the runway 202, aerial vehicles that are approaching to land on the runway 202, and/or aerial vehicles that are flying proximate the first end 207 of the runway 202 after takeoff or in preparation for landing.

Likewise, at the second end 208 of the runway 202, two radar sensors 210-3, 210-4 may be positioned and oriented in particular directions to detect aerial vehicles proximate the second end 208 of the runway 202. The third radar sensor 210-3 may have a field of view 212-3 that is oriented to emit electromagnetic or radio waves substantially toward a direction of the runway 202. In this manner, the third radar sensor 210-3 may detect aerial vehicles that are on the runway 202, e.g., aerial vehicles that are taking off from the runway 202, aerial vehicles that have landed on the runway 202, and/or aerial vehicles that are taxiing onto or off the runway 202. Further, the third radar sensor 210-3 may have a relatively wide field of view 212-3 in order to also detect aerial vehicles that are on the various taxiways (not shown).

The fourth radar sensor 210-4 may have a field of view 212-4 that is oriented to emit electromagnetic or radio waves substantially toward a second approach corridor associated with the second end 208 of the runway 202. In this manner, the fourth radar sensor 210-4 may detect aerial vehicles that are within the second approach corridor, e.g., aerial vehicles that have taken off from the runway 202, aerial vehicles that are approaching to land on the runway 202, and/or aerial vehicles that are flying proximate the second end 208 of the runway 202 after takeoff or in preparation for landing.

As described above, in other example embodiments, instead of or in addition to one or more radar sensors 210 as described herein, the automated air traffic control systems described herein may utilize various other types of sensors to detect aerial vehicles proximate a runway of an airfield, such as LIDAR sensors, imaging sensors, infrared sensors, acoustic sensors, or other types of sensors. In addition, the automated air traffic control systems described herein may utilize various combinations of different types of sensors to detect aerial vehicles proximate a runway of an airfield, e.g., such as radar sensors and imaging sensors, radar sensors and LIDAR sensors, or various other combinations.

Figure 3:
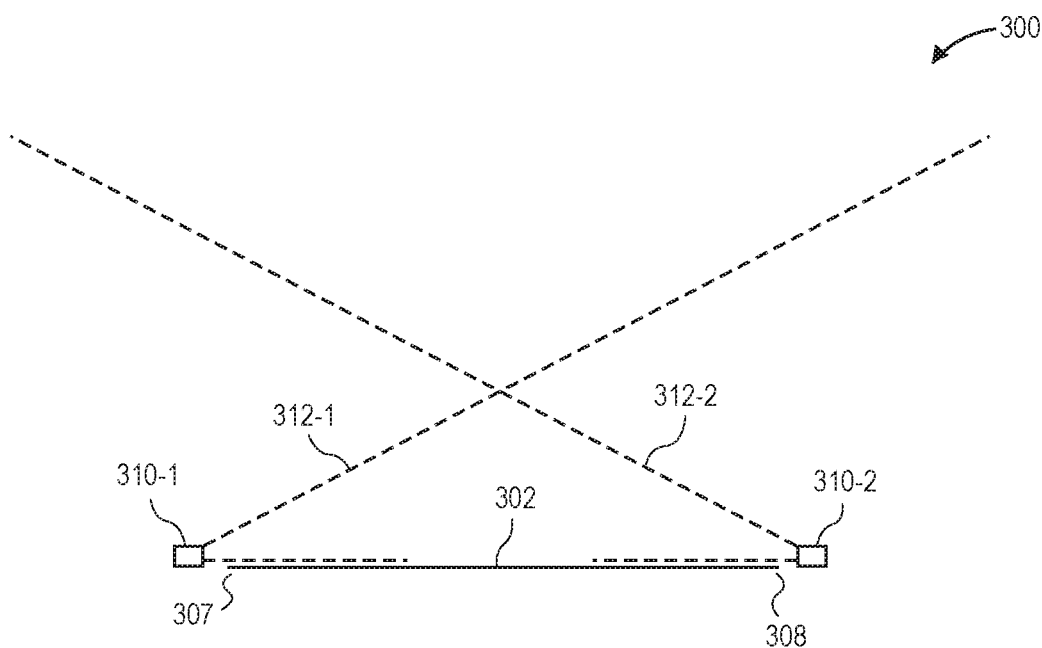
FIG. 3 is a schematic, side view diagram of another example automated air traffic control system, in accordance with disclosed implementations.

FIG. 3 is a schematic, side view diagram of another example automated air traffic control system 300, in accordance with disclosed implementations. The example automated air traffic control system 300 may be similar to the example automated air traffic control systems 100, 200 described with respect to FIGS. 1 and 2. Various features described with respect to the example automated air traffic control systems 100, 200 of FIGS. 1 and 2 may also be included in the example automated air traffic control system 300 of FIG. 3.

For example, as shown in FIG. 3, a runway 302 may extend between a first end 307 and a second, opposite end 308. Various taxiways (not shown) may be associated with and positioned around or near the runway 302.

At the first end 307 of the runway 302, a first radar sensor 310-1 may be positioned and oriented in a particular direction and orientation. The first radar sensor 310-1 may have a field of view 312-1 that is oriented to emit electromagnetic or radio waves substantially toward a direction of the runway 302, and also substantially toward a second approach corridor associated with the second, opposite end 308 of the runway 302. In this manner, the first radar sensor 310-1 may detect aerial vehicles that are on the runway 302, e.g., aerial vehicles that are taking off from the runway 302, aerial vehicles that have landed on the runway 302, and/or aerial vehicles that are taxiing onto or off the runway 302. Further, the first radar sensor 310-1 may have a relatively wide field of view 312-1 in order to also detect aerial vehicles that are on the various taxiways (not shown). Moreover, because the first radar sensor 310-1 has a field of view 312-1 that is also oriented substantially toward a second approach corridor associated with the second end 308 of the runway 302, the first radar sensor 310-1 may also detect aerial vehicles that are within the second approach corridor, e.g., aerial vehicles that have taken off from the runway 302, aerial vehicles that are approaching to land on the runway 302, and/or aerial vehicles that are flying proximate the second end 308 of the runway 302 after takeoff or in preparation for landing.

Likewise, at the second end 308 of the runway 302, a second radar sensor 310-2 may be positioned and oriented in a particular direction and orientation. The second radar sensor 310-2 may have a field of view 312-2 that is oriented to emit electromagnetic or radio waves substantially toward a direction of the runway 302, and also substantially toward a first approach corridor associated with the first, opposite end 307 of the runway 302. In this manner, the second radar sensor 310-2 may detect aerial vehicles that are on the runway 302, e.g., aerial vehicles that are taking off from the runway 302, aerial vehicles that have landed on the runway 302, and/or aerial vehicles that are taxiing onto or off the runway 302. Further, the second radar sensor 310-2 may have a relatively wide field of view 312-2 in order to also detect aerial vehicles that are on the various taxiways (not shown). Moreover, because the second radar sensor 310-2 has a field of view 312-2 that is also oriented substantially toward a first approach corridor associated with the first end 307 of the runway 302, the second radar sensor 310-2 may also detect aerial vehicles that are within the first approach corridor, e.g., aerial vehicles that have taken off from the runway 302, aerial vehicles that are approaching to land on the runway 302, and/or aerial vehicles that are flying proximate the first end 307 of the runway 302 after takeoff or in preparation for landing.

In contrast to the radar sensors 110, 210 described with respect to FIGS. 1 and 2, the radar sensors 310 described with respect to FIG. 3 may have differently shaped and/or relatively larger fields of view, e.g., the radar sensors 310 may have sufficiently wide or horizontally large fields of view 312 in order to detect any aerial vehicles on the runway 302 and/or taxiways between the first end 307 and the second end 308 of the runway 302, and may also have sufficiently tall or vertically large fields of view 312 in order to detect any aerial vehicles on the runway 302 as well as within the respective approach corridors at respective opposite ends 307, 308 of the runway 302.

As described above, in other example embodiments, instead of or in addition to one or more radar sensors 310 as described herein, the automated air traffic control systems described herein may utilize various other types of sensors to detect aerial vehicles proximate a runway of an airfield, such as LIDAR sensors, imaging sensors, infrared sensors, acoustic sensors, or other types of sensors. In addition, the automated air traffic control systems described herein may utilize various combinations of different types of sensors to detect aerial vehicles proximate a runway of an airfield, e.g., such as radar sensors and imaging sensors, radar sensors and LIDAR sensors, or various other combinations.

The radar sensors described herein, or various other types of sensors that may be used in place of or in addition to radar sensors, may detect data, signals, waves, patterns, features, or objects associated with one or more characteristics of aerial vehicles. For example, the one or more characteristics of aerial vehicles may include identification, position, orientation, altitude, range or distance between an aerial vehicle and a runway or sensor, heading, speed, flight plan, remaining flight range, or other characteristics of aerial vehicles proximate a runway of an airfield. Various types of sensors may emit a signal, wave, or pattern and receive a reflected signal, wave, or pattern from a detected object, such as an aerial vehicle, whereas other types of sensors may only receive a signal, wave, or pattern, such as light or sound, from a detected object, such as an aerial vehicle. Based at least in part on the emitted and/or received signals, as well as a time of flight of the emitted and/or received signals, one or more of the characteristics of aerial vehicles may be determined, such as identification, position, orientation, altitude, or range or distance between an aerial vehicle and a runway or sensor. Further, based at least in part on a plurality of emitted and/or received signals, as well as times of flight of the plurality of emitted and/or received signals, one or more characteristics of aerial vehicles may be determined, such as identification, position, orientation, altitude, range or distance between an aerial vehicle and a runway or sensor, heading, or speed. Some types of sensors, such as radar sensors, may be able to detect one or more characteristics, such as heading or speed, without requiring a plurality of emitted and reflected signals, e.g., by utilizing the Doppler effect.

The various data received by the radar sensors described herein, or various other types of sensors that may be used in place of or in addition to radar sensors, may be processed by one or more processors to determine the one or more characteristics of aerial vehicles, such as identification, position, orientation, altitude, range or distance between an aerial vehicle and a runway or sensor, heading, speed, flight plan, remaining flight range, or other characteristics of aerial vehicles proximate a runway of an airfield. Various data processing techniques or algorithms, which may further leverage machine learning techniques or algorithms, may be used to process the various sensor data received by the sensors, such as radar data processing techniques or algorithms, LIDAR data processing techniques or algorithms, imaging data processing techniques or algorithms, infrared data processing techniques or algorithms, acoustic data processing techniques or algorithms, or other types of processing techniques or algorithms corresponding to sensor data, signals, waves, patterns, features, or objects received by various types of sensors. Each of the various data processing techniques or algorithms may process the sensor data to detect objects, identify objects, determine positions, orientations, and/or altitudes of objects, determine distances or ranges to objects, and/or determine heading and speed of objects. Further, the one or more characteristics of aerial vehicles detected by the various types of sensors may be determined based at least in part on aspects associated with the various types of sensors, such as positions, orientations, fields of view, depths of field, sensor data resolutions, or other aspects or characteristics associated with the various types of sensors.

Based at least in part on the various sensor data received from various types of sensors that is processed by the various data processing techniques or algorithms, one or more processors may determine instruction data to be transmitted or provided to the detected object, such as an aerial vehicle. The instruction data may include identification, position, orientation, altitude, heading, speed, flight plan, flight pattern, turns, reroutes, delays, takeoff instructions, landing instructions, taxiing instructions, or other instructions. The one or more processors may utilize various logic, programming, rules, or other control techniques or algorithms, which may further leverage machine learning techniques or algorithms, in order to determine the instruction data that may be used control and coordinate operations of an aerial vehicle proximate a runway of an airfield. Further, the one or more processors may also determine the instruction data to control and coordinate operations of a plurality of aerial vehicles proximate a runway of an airfield to ensure safe coordination and cooperation of all of the plurality of aerial vehicles.

In some example embodiments, various logic, programming, or rules may be associated with takeoff operations of aerial vehicles from the runway, including various aspects such as takeoff order or priority, takeoff directions, takeoff angles, takeoff flight patterns, reroutes, delays, speeds, frequency, spacing, timing, intervals, or other aspects. In addition, various logic, programming, or rules may be associated with landing operations of aerial vehicles onto the runway, including various aspects such as landing flight patterns, reroutes, delays, landing order or priority, landing or approach directions, landing or approach angles, speeds, frequency, spacing, timing, intervals, or other aspects. Further, various logic, programming, or rules may be associated with taxiing operations of aerial vehicles on the runway and/or taxiways, including various aspects such as taxiing order or priority, taxiing directions, taxiing routing or delays, ground speeds, spacing, timing, intervals, or other aspects. Moreover, in order to coordinate the operations of a plurality of aerial vehicles proximate the runway, whether airborne or on the ground, various logic, programming, or rules may be associated with coordinating operations of the plurality of aerial vehicles proximate the runway, including various aspects such as order or priority, reroutes, delays, speeds, frequency, spacing, timing, intervals, or other aspects, in addition to and in combination with the various logic, programming, or rules associated with takeoff operations, landing operations, taxiing operations, or other operations that may be apply to respective individual aerial vehicles of the plurality of aerial vehicles.

Upon determining the instruction data for one or more aerial vehicles proximate a runway of an airfield, the one or more processors may transmit or provide the instruction data to the one or more aerial vehicles, using various types of communication or network technologies, such as wireless, radio, cellular, satellite, or other types of communication or network technologies. Then, the aerial vehicles may coordinate their operations based on the received instruction data to ensure safe and efficient cooperation among the one or more aerial vehicles proximate the runway.

The example operations of the one or more aerial vehicles can include various types of operations. For example, one or more aerial vehicles may be traveling along or taking off from the runway, one or more aerial vehicles may have taken off and initiated flight patterns around and/or away from the runway, one or more aerial vehicles may have arrived proximate the runway and initiated flight patterns around and/or toward the runway for landing, one or more aerial vehicles may be approaching or landing on the runway, one or more aerial vehicles may be taxiing from the runway to a terminal, one or more aerial vehicles may be taxiing from the terminal to the runway, and/or one or more aerial vehicles may be taxiing between one or more runways, taxiways, and/or terminals. Various combinations of the example operations of aerial vehicles proximate a runway of an airfield, including various stages, phases, or portions of takeoff, landing, and/or taxiing operations, may be coordinated to ensure safe and efficient operations and cooperation among one or more aerial vehicles proximate the runway.

In further example embodiments, various aerial vehicles that may be controlled and coordinated using the automated air traffic control systems and methods described herein may comprise manned aerial vehicles, e.g., operated by human pilots. In order to facilitate seamless integration and coordination of manned aerial vehicles and unmanned aerial vehicles using the automated air traffic control systems and methods described herein, one or more processors may also include various speech-to-data (and data-to-speech) processing techniques or algorithms, such as various speech recognition algorithms and/or speech synthesis algorithms, which may further leverage machine learning techniques or algorithms, to convert or translate between data that may be utilized by aerial vehicle control systems of unmanned aerial vehicles and speech or audio input/output that may be understood and utilized by human pilots of manned aerial vehicles.

For example, audio flight information provided by human pilots of manned aerial vehicles may include one or more characteristics of aerial vehicles, such as identification, position, orientation, altitude, range or distance between an aerial vehicle and a runway or sensor, heading, speed, flight plan, remaining flight range, or other characteristics, and the audio flight information may be translated or converted into flight data, similar to the sensor data described herein, for processing by the one or more processors. In addition, instruction data determined for manned aerial vehicles by the one or more processors, e.g., based on the flight data and/or sensor data, may include identification, position, orientation, altitude, heading, speed, flight plan, flight pattern, turns, reroutes, delays, takeoff instructions, landing instructions, taxiing instructions, or other instructions, and the instruction data may be translated or converted into audio flight instructions, which may then be transmitted or provided as audio output that may be understood and utilized by human pilots of the manned aerial vehicles.

With the incorporation of various sensor data processing techniques or algorithms, various instruction data processing techniques or algorithms, and various speech-to-data processing techniques or algorithms, the automated air traffic control systems and methods described herein may enable seamless integration, coordination, and cooperation between unmanned aerial vehicles, manned aerial vehicles, and various combinations thereof. In this manner, various operations of aerial vehicles, whether unmanned or manned, may be safely and efficiently coordinated at one or more runways of airports, airfields, airstrips, aerodromes, or similar locations utilizing the automated air traffic control systems and methods described herein. Further, the automated air traffic control systems and methods described herein may transform an uncontrolled airfield having no operational control tower into a controlled and coordinated airfield that facilitates safe and efficient operations of individual aerial vehicles, as well as safe and efficient coordination and cooperation among a plurality of aerial vehicles, including both unmanned aerial vehicles and manned aerial vehicles.

Figure 4:
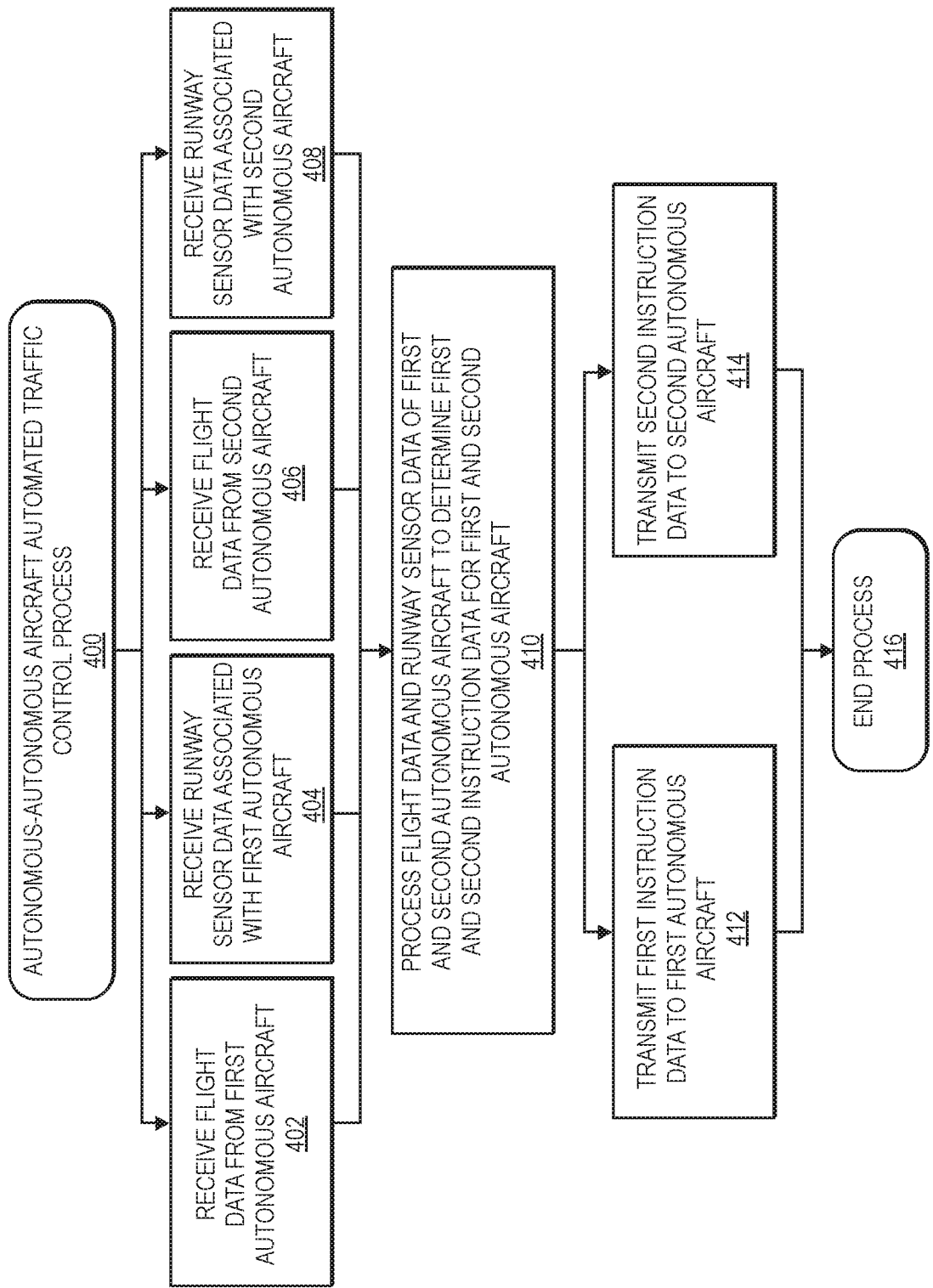
FIG. 4 is a flow diagram illustrating an example autonomous-autonomous aircraft automated traffic control process, in accordance with disclosed implementations.

FIG. 4 is a flow diagram illustrating an example autonomous-autonomous aircraft automated traffic control process 400, in accordance with disclosed implementations.

The process 400 may begin by receiving flight data from a first autonomous aircraft, as at 402. For example, a first autonomous or unmanned aerial vehicle may transmit various flight data or information to a controller responsive to being proximate a runway of an airfield. As described above, the flight data may be associated with identification, position, orientation, altitude, heading, speed, flight plan, remaining flight range, or other characteristics of the first unmanned aerial vehicle. The controller may receive the flight data from the first unmanned aerial vehicle using various communication or network technologies.

The process 400 may also include receiving runway sensor data associated with the first autonomous aircraft, as at 404. For example, one or more sensors associated with respective ends of a runway may receive data or signals associated with the first autonomous or unmanned aerial vehicle proximate a runway of an airfield. As described above, the runway sensor data may be associated with identification, position, orientation, altitude, range or distance between an aerial vehicle and a runway or sensor, heading, speed, flight plan, remaining flight range, or other characteristics of the first unmanned aerial vehicle. The controller may receive the runway sensor data associated with the first unmanned aerial vehicle using various communication or network technologies.

The process 400 may further include receiving flight data from a second autonomous aircraft, as at 406. For example, a second autonomous or unmanned aerial vehicle may transmit various flight data or information to a controller responsive to being proximate a runway of an airfield. As described above, the flight data may be associated with identification, position, orientation, altitude, heading, speed, flight plan, remaining flight range, or other characteristics of the second unmanned aerial vehicle. The controller may receive the flight data from the second unmanned aerial vehicle using various communication or network technologies.

The process 400 may still further include receiving runway sensor data associated with the second autonomous aircraft, as at 408. For example, one or more sensors associated with respective ends of a runway may receive data or signals associated with the second autonomous or unmanned aerial vehicle proximate a runway of an airfield. As described above, the runway sensor data may be associated with identification, position, orientation, altitude, range or distance between an aerial vehicle and a runway or sensor, heading, speed, flight plan, remaining flight range, or other characteristics of the second unmanned aerial vehicle. The controller may receive the runway sensor data associated with the second unmanned aerial vehicle using various communication or network technologies.

The process 400 may then proceed to process the flight data and the runway sensor data of the first and second autonomous aircraft to determine first and second instruction data for the first and second autonomous aircraft, as at 410. For example, one or more processors associated with the controller may process the flight data, if any is received, and the runway sensor data associated with the first and second autonomous or unmanned aerial vehicles to determine one or more characteristics of the first and second unmanned aerial vehicles, such as identification, position, orientation, altitude, range or distance between an aerial vehicle and a runway or sensor, heading, speed, flight plan, remaining flight range, or other characteristics. The one or more processors may utilize various data processing techniques and algorithms, such as radar data processing techniques and algorithms, LIDAR data processing techniques and algorithms, imaging data processing techniques and algorithms, infrared data processing techniques and algorithms, acoustic data processing techniques and algorithms, other data processing techniques and algorithms, and/or machine learning techniques and algorithms. In addition, one or more processors associated with the controller may determine first and second instruction data for the first and second unmanned aerial vehicles based at least in part on the determined one or more characteristics of the first and second unmanned aerial vehicles based on the flight data and/or runway sensor data. The instruction data for the first and second unmanned aerial vehicles may be associated with identification, position, orientation, altitude, heading, speed, flight plan, flight pattern, turns, reroutes, delays, takeoff instructions, landing instructions, taxiing instructions, or other instructions. The one or more processors may utilize various logic, programming, rules, or other control techniques or algorithms, and/or machine learning techniques or algorithms, to determine the first and second instruction data.

The process 400 may then continue with transmitting the first instruction data to the first autonomous aircraft, as at 412, and transmitting the second instruction data to the second autonomous aircraft, as at 414. For example, the controller may transmit the first instruction data to the first autonomous or unmanned aerial vehicle, and the controller may transmit the second instruction data to the second autonomous or unmanned aerial vehicle, in order to coordinate the operations of the first and second unmanned aerial vehicles for safe and efficient operation proximate the runway. The controller may transmit the first and second instruction data to the first and second unmanned aerial vehicles using various communication or network technologies. The process 400 may then end, as at 416.

Although FIG. 4 describes an automated traffic control process including two autonomous aircraft, the process 400 may be modified to coordinate operations of other numbers of autonomous aircraft. For example, various portions of the process 400 may be performed and/or omitted to control and coordinate operations of a single autonomous aircraft proximate a runway of an airfield, and/or various portions of the process 400 may be performed and/or repeated to control and coordinate operations of a plurality of autonomous aircraft proximate a runway of an airfield. Various other modifications and changes to the automated traffic control process 400 of FIG. 4 are also possible.

Figure 5:
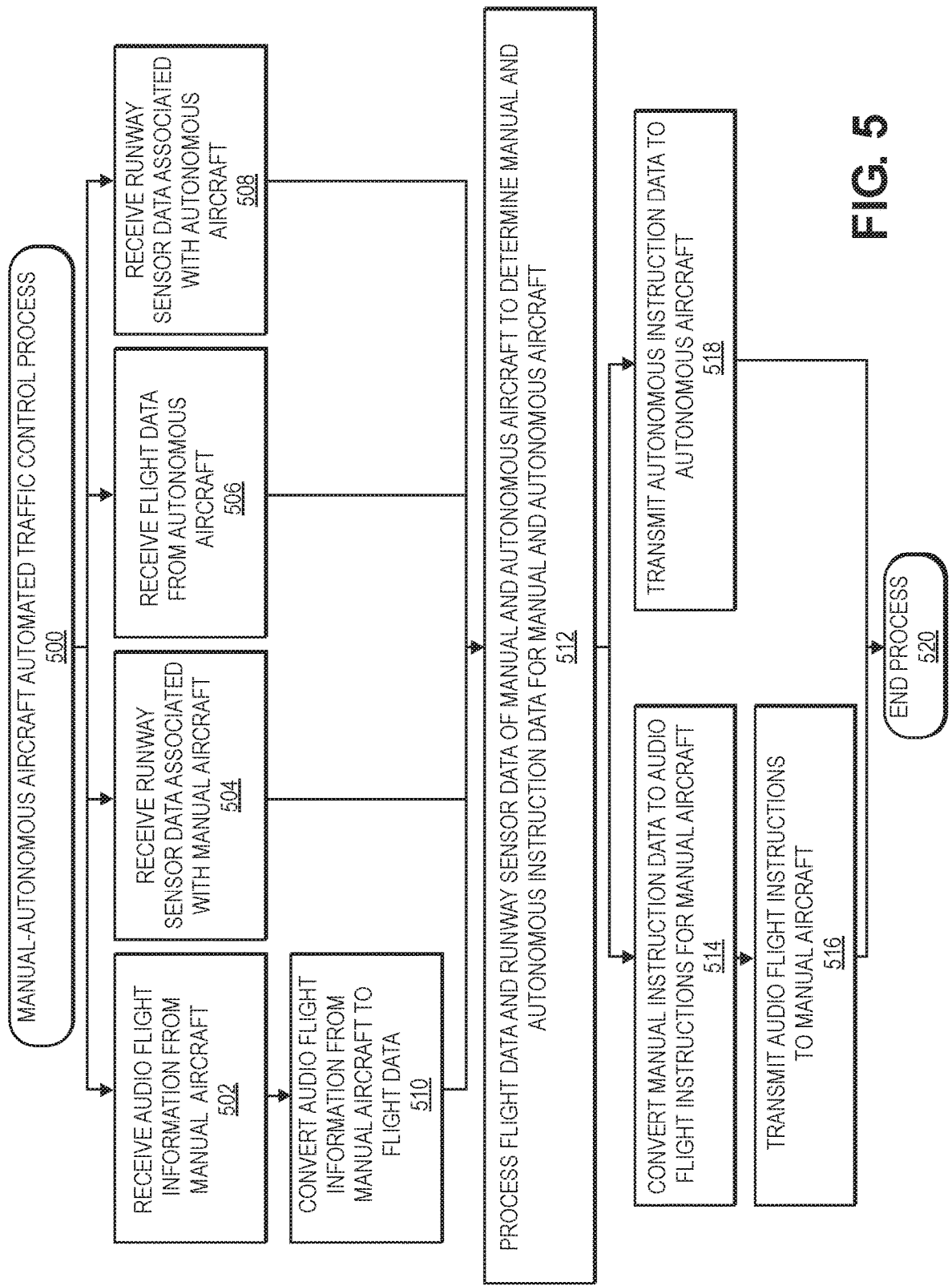
FIG. 5 is a flow diagram illustrating an example manual-autonomous aircraft automated traffic control process, in accordance with disclosed implementations.

FIG. 5 is a flow diagram illustrating an example manual-autonomous aircraft automated traffic control process 500, in accordance with disclosed implementations.

The process 500 may begin by receiving audio flight information from a manual aircraft, as at 502. For example, a manual or manned aerial vehicle may transmit, e.g., by a human pilot of the manned aerial vehicle, various audio flight information to a controller responsive to being proximate a runway of an airfield. As described above, the audio flight information may be associated with identification, position, orientation, altitude, heading, speed, flight plan, remaining flight range, or other characteristics of the manned aerial vehicle. The controller may receive the audio flight information from the manned aerial vehicle using various communication or network technologies.

The process 500 may also include receiving runway sensor data associated with the manual aircraft, as at 504. For example, one or more sensors associated with respective ends of a runway may receive data or signals associated with the manual or manned aerial vehicle proximate a runway of an airfield. As described above, the runway sensor data may be associated with identification, position, orientation, altitude, range or distance between an aerial vehicle and a runway or sensor, heading, speed, flight plan, remaining flight range, or other characteristics of the manned aerial vehicle. The controller may receive the runway sensor data associated with the manned aerial vehicle using various communication or network technologies.

The process 500 may further include receiving flight data from an autonomous aircraft, as at 506. For example, an autonomous or unmanned aerial vehicle may transmit various flight data or information to a controller responsive to being proximate a runway of an airfield. As described above, the flight data may be associated with identification, position, orientation, altitude, heading, speed, flight plan, remaining flight range, or other characteristics of the unmanned aerial vehicle. The controller may receive the flight data from the unmanned aerial vehicle using various communication or network technologies.

The process 500 may still further include receiving runway sensor data associated with the autonomous aircraft, as at 508. For example, one or more sensors associated with respective ends of a runway may receive data or signals associated with the autonomous or unmanned aerial vehicle proximate a runway of an airfield. As described above, the runway sensor data may be associated with identification, position, orientation, altitude, range or distance between an aerial vehicle and a runway or sensor, heading, speed, flight plan, remaining flight range, or other characteristics of the unmanned aerial vehicle. The controller may receive the runway sensor data associated with the unmanned aerial vehicle using various communication or network technologies.

The process 500 may then continue by converting the audio flight information from the manual aircraft to flight data, as at 510. For example, one or more processors associated with the controller may process the audio flight information, e.g., audio input received from a human pilot of the manned aerial vehicle, to convert or translate the audio flight information to flight data associated with the manned aerial vehicle. As described above, the flight data may be associated with identification, position, orientation, altitude, heading, speed, flight plan, remaining flight range, or other characteristics of the manned aerial vehicle. The one or more processors may utilize various speech-to-data processing techniques or algorithms, such as various speech recognition algorithms, speech synthesis algorithms, and/or machine learning techniques or algorithms, to convert or translate between speech or audio input/output that may be understood and utilized by human pilots of manned aerial vehicles and data that may be utilized by the controller, one or more processors thereof, and/or aerial vehicle control systems of unmanned aerial vehicles.

The process 500 may then proceed to process the flight data and the runway sensor data of the manual and autonomous aircraft to determine manual and autonomous instruction data for the manual and autonomous aircraft, as at 512. For example, one or more processors associated with the controller may process the flight data, if any is received, and the runway sensor data associated with the manual or manned and autonomous or unmanned aerial vehicles to determine one or more characteristics of the manned and unmanned aerial vehicles, such as identification, position, orientation, altitude, range or distance between an aerial vehicle and a runway or sensor, heading, speed, flight plan, remaining flight range, or other characteristics. The one or more processors may utilize various data processing techniques and algorithms, such as radar data processing techniques and algorithms, LIDAR data processing techniques and algorithms, imaging data processing techniques and algorithms, infrared data processing techniques and algorithms, acoustic data processing techniques and algorithms, other data processing techniques and algorithms, and/or machine learning techniques and algorithms. In addition, one or more processors associated with the controller may determine manual and autonomous instruction data for the manned and unmanned aerial vehicles based at least in part on the determined one or more characteristics of the manned and unmanned aerial vehicles based on the flight data and/or runway sensor data. The instruction data for the manned and unmanned aerial vehicles may be associated with identification, position, orientation, altitude, heading, speed, flight plan, flight pattern, turns, reroutes, delays, takeoff instructions, landing instructions, taxiing instructions, or other instructions. The one or more processors may utilize various logic, programming, rules, or other control techniques or algorithms, and/or machine learning techniques or algorithms, to determine the manual and autonomous instruction data.

The process 500 may then proceed by converting the manual instruction data to audio flight instructions for the manual aircraft, as at 514. For example, one or more processors associated with the controller may process the manual instruction data to convert or translate the manual instruction data to audio flight instructions, e.g., audio output to be provided to a human pilot of the manned aerial vehicle, for the manned aerial vehicle. As described above, the manual instruction data may be associated with identification, position, orientation, altitude, heading, speed, flight plan, flight pattern, turns, reroutes, delays, takeoff instructions, landing instructions, taxiing instructions, or other instructions. The one or more processors may utilize various speech-to-data (or data-to-speech) processing techniques or algorithms, such as various speech recognition algorithms, speech synthesis algorithms, and/or machine learning techniques or algorithms, to convert or translate between data that may be utilized by the controller, one or more processors thereof, and/or aerial vehicle control systems of unmanned aerial vehicles and speech or audio input/output that may be understood and utilized by human pilots of manned aerial vehicles.

The process 500 may then continue with transmitting the audio flight instructions to the manual aircraft, as at 516, and transmitting the autonomous instruction data to the autonomous aircraft, as at 518. For example, the controller may transmit the audio flight instructions to the manual or manned aerial vehicle, e.g., to be provided as audio output to a human pilot of the manned aerial vehicle, and the controller may transmit the autonomous instruction data to the autonomous or unmanned aerial vehicle, in order to coordinate the operations of the manned and unmanned aerial vehicles for safe and efficient operation proximate the runway. The controller may transmit the audio flight instructions and the autonomous instruction data to the manned and unmanned aerial vehicles using various communication or network technologies. The process 500 may then end, as at 520.

Although FIG. 5 describes an automated traffic control process including one manual aircraft and one autonomous aircraft, the process 500 may be modified to coordinate operations of other numbers of manual and autonomous aircraft. For example, various portions of the process 500 may be performed and/or omitted to control and coordinate operations of a single manual aircraft or a single autonomous aircraft proximate a runway of an airfield, and/or various portions of the process 500 may be performed and/or repeated to control and coordinate operations of a plurality of manual and/or autonomous aircraft proximate a runway of an airfield. Various other modifications and changes to the automated traffic control process 500 of FIG. 5 are also possible.

Figure 6:
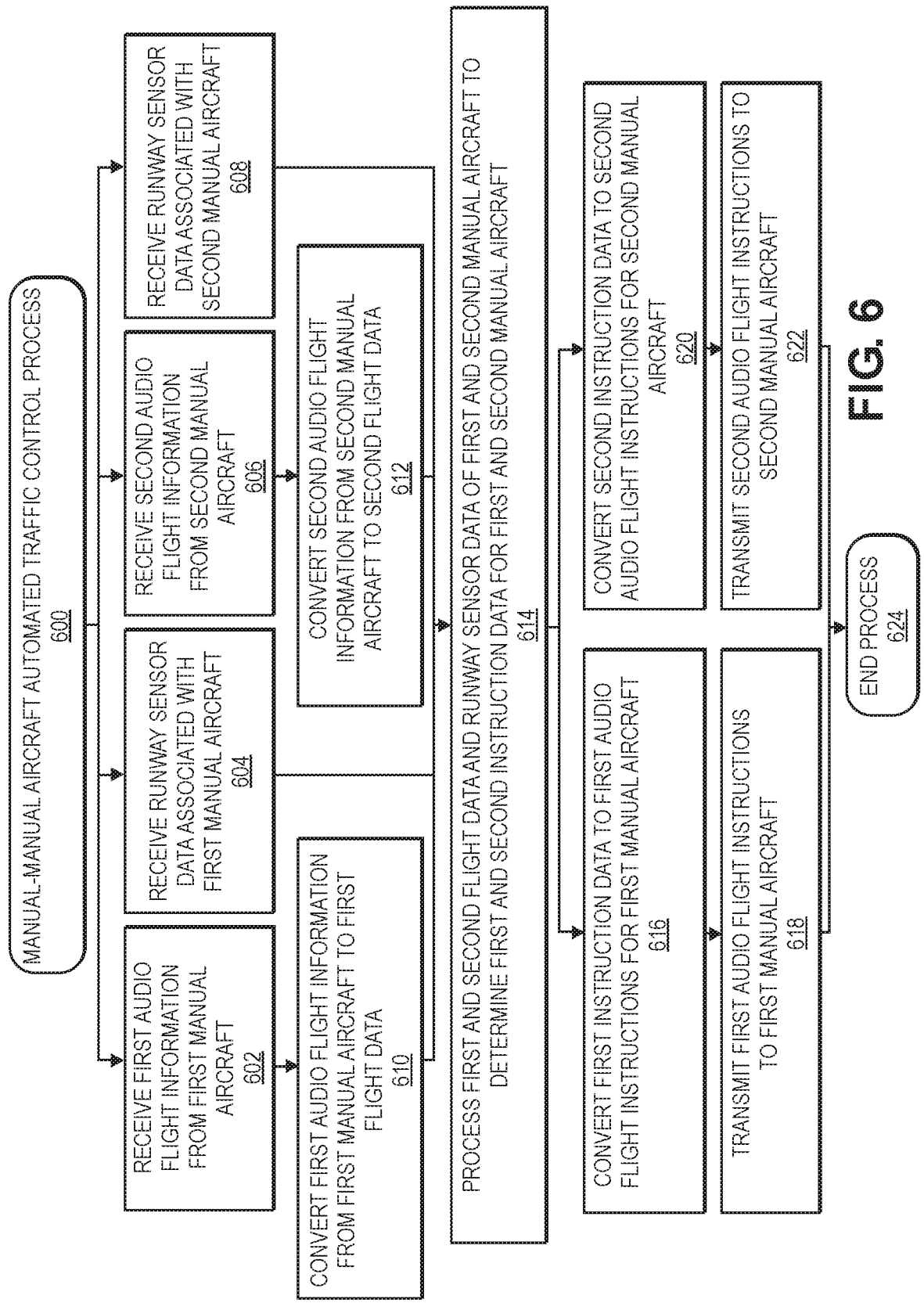
FIG. 6 is a flow diagram illustrating an example manual-manual aircraft automated traffic control process, in accordance with disclosed implementations.

FIG. 6 is a flow diagram illustrating an example manual-manual aircraft automated traffic control process 600, in accordance with disclosed implementations.

The process 600 may begin by receiving first audio flight information from a first manual aircraft, as at 602. For example, a first manual or manned aerial vehicle may transmit, e.g., by a human pilot of the first manned aerial vehicle, various first audio flight information to a controller responsive to being proximate a runway of an airfield. As described above, the first audio flight information may be associated with identification, position, orientation, altitude, heading, speed, flight plan, remaining flight range, or other characteristics of the first manned aerial vehicle. The controller may receive the first audio flight information from the first manned aerial vehicle using various communication or network technologies.

The process 600 may also include receiving runway sensor data associated with the first manual aircraft, as at 604. For example, one or more sensors associated with respective ends of a runway may receive data or signals associated with the first manual or manned aerial vehicle proximate a runway of an airfield. As described above, the runway sensor data may be associated with identification, position, orientation, altitude, range or distance between an aerial vehicle and a runway or sensor, heading, speed, flight plan, remaining flight range, or other characteristics of the first manned aerial vehicle. The controller may receive the runway sensor data associated with the first manned aerial vehicle using various communication or network technologies.

The process 600 may further include receiving second audio flight information from a second manual aircraft, as at 606. For example, a second manual or manned aerial vehicle may transmit, e.g., by a human pilot of the second manned aerial vehicle, various second audio flight information to a controller responsive to being proximate a runway of an airfield. As described above, the second audio flight information may be associated with identification, position, orientation, altitude, heading, speed, flight plan, remaining flight range, or other characteristics of the second manned aerial vehicle. The controller may receive the second audio flight information from the second manned aerial vehicle using various communication or network technologies.

The process 600 may still further include receiving runway sensor data associated with the second manual aircraft, as at 608. For example, one or more sensors associated with respective ends of a runway may receive data or signals associated with the second manual or manned aerial vehicle proximate a runway of an airfield. As described above, the runway sensor data may be associated with identification, position, orientation, altitude, range or distance between an aerial vehicle and a runway or sensor, heading, speed, flight plan, remaining flight range, or other characteristics of the second manned aerial vehicle. The controller may receive the runway sensor data associated with the second manned aerial vehicle using various communication or network technologies.

The process 600 may then continue by converting the first audio flight information from the first manual aircraft to first flight data, as at 610. For example, one or more processors associated with the controller may process the first audio flight information, e.g., audio input received from a human pilot of the first manned aerial vehicle, to convert or translate the first audio flight information to first flight data associated with the first manned aerial vehicle. As described above, the first flight data may be associated with identification, position, orientation, altitude, heading, speed, flight plan, remaining flight range, or other characteristics of the first manned aerial vehicle. The one or more processors may utilize various speech-to-data processing techniques or algorithms, such as various speech recognition algorithms, speech synthesis algorithms, and/or machine learning techniques or algorithms, to convert or translate between speech or audio input/output that may be understood and utilized by human pilots of manned aerial vehicles and data that may be utilized by the controller, one or more processors thereof, and/or aerial vehicle control systems of unmanned aerial vehicles.

The process 600 may also continue by converting the second audio flight information from the second manual aircraft to second flight data, as at 612. For example, one or more processors associated with the controller may process the second audio flight information, e.g., audio input received from a human pilot of the second manned aerial vehicle, to convert or translate the second audio flight information to second flight data associated with the second manned aerial vehicle. As described above, the second flight data may be associated with identification, position, orientation, altitude, heading, speed, flight plan, remaining flight range, or other characteristics of the second manned aerial vehicle. The one or more processors may utilize various speech-to-data processing techniques or algorithms, such as various speech recognition algorithms, speech synthesis algorithms, and/or machine learning techniques or algorithms, to convert or translate between speech or audio input/output that may be understood and utilized by human pilots of manned aerial vehicles and data that may be utilized by the controller, one or more processors thereof, and/or aerial vehicle control systems of unmanned aerial vehicles.

The process 600 may then proceed to process the first and second flight data and the runway sensor data of the first and second manual aircraft to determine first and second instruction data for the first and second manual aircraft, as at 614. For example, one or more processors associated with the controller may process the first and second flight data, if any is received, and the runway sensor data associated with the first and second manual or manned aerial vehicles to determine one or more characteristics of the first and second manned aerial vehicles, such as identification, position, orientation, altitude, range or distance between an aerial vehicle and a runway or sensor, heading, speed, flight plan, remaining flight range, or other characteristics. The one or more processors may utilize various data processing techniques and algorithms, such as radar data processing techniques and algorithms, LIDAR data processing techniques and algorithms, imaging data processing techniques and algorithms, infrared data processing techniques and algorithms, acoustic data processing techniques and algorithms, other data processing techniques and algorithms, and/or machine learning techniques and algorithms. In addition, one or more processors associated with the controller may determine first and second instruction data for the first and second manned aerial vehicles based at least in part on the determined one or more characteristics of the first and second manned aerial vehicles based on the first and second flight data and/or runway sensor data. The first and second instruction data for the first and second manned aerial vehicles may be associated with identification, position, orientation, altitude, heading, speed, flight plan, flight pattern, turns, reroutes, delays, takeoff instructions, landing instructions, taxiing instructions, or other instructions. The one or more processors may utilize various logic, programming, rules, or other control techniques or algorithms, and/or machine learning techniques or algorithms, to determine the first and second instruction data.

The process 600 may then continue by converting the first instruction data to first audio flight instructions for the first manual aircraft, as at 616. For example, one or more processors associated with the controller may process the first instruction data to convert or translate the first instruction data to first audio flight instructions, e.g., audio output to be provided to a human pilot of the first manned aerial vehicle, for the first manned aerial vehicle. As described above, the first instruction data may be associated with identification, position, orientation, altitude, heading, speed, flight plan, flight pattern, turns, reroutes, delays, takeoff instructions, landing instructions, taxiing instructions, or other instructions. The one or more processors may utilize various speech-to-data (or data-to-speech) processing techniques or algorithms, such as various speech recognition algorithms, speech synthesis algorithms, and/or machine learning techniques or algorithms, to convert or translate between data that may be utilized by the controller, one or more processors thereof, and/or aerial vehicle control systems of unmanned aerial vehicles and speech or audio input/output that may be understood and utilized by human pilots of manned aerial vehicles.

The process 600 may then proceed with transmitting the first audio flight instructions to the first manual aircraft, as at 618. For example, the controller may transmit the first audio flight instructions to the first manual or manned aerial vehicle, e.g., to be provided as audio output to a human pilot of the first manned aerial vehicle, in order to coordinate the operations of the first and second manned aerial vehicles for safe and efficient operation proximate the runway. The controller may transmit the first audio flight instructions to the first manned aerial vehicle using various communication or network technologies.

The process 600 may also continue by converting the second instruction data to second audio flight instructions for the second manual aircraft, as at 620. For example, one or more processors associated with the controller may process the second instruction data to convert or translate the second instruction data to second audio flight instructions, e.g., audio output to be provided to a human pilot of the second manned aerial vehicle, for the second manned aerial vehicle. As described above, the second instruction data may be associated with identification, position, orientation, altitude, heading, speed, flight plan, flight pattern, turns, reroutes, delays, takeoff instructions, landing instructions, taxiing instructions, or other instructions. The one or more processors may utilize various speech-to-data (or data-to-speech) processing techniques or algorithms, such as various speech recognition algorithms, speech synthesis algorithms, and/or machine learning techniques or algorithms, to convert or translate between data that may be utilized by the controller, one or more processors thereof, and/or aerial vehicle control systems of unmanned aerial vehicles and speech or audio input/output that may be understood and utilized by human pilots of manned aerial vehicles.

The process 600 may then proceed with transmitting the second audio flight instructions to the second manual aircraft, as at 622. For example, the controller may transmit the second audio flight instructions to the second manual or manned aerial vehicle, e.g., to be provided as audio output to a human pilot of the second manned aerial vehicle, in order to coordinate the operations of the first and second manned aerial vehicles for safe and efficient operation proximate the runway. The controller may transmit the second audio flight instructions to the second manned aerial vehicle using various communication or network technologies. The process 600 may then end, as at 624.

Although FIG. 6 describes an automated traffic control process including two manual aircraft, the process 600 may be modified to coordinate operations of other numbers of manual aircraft. For example, various portions of the process 600 may be performed and/or omitted to control and coordinate operations of a single manual aircraft proximate a runway of an airfield, and/or various portions of the process 600 may be performed and/or repeated to control and coordinate operations of a plurality of manual aircraft proximate a runway of an airfield. Various other modifications and changes to the automated traffic control process 600 of FIG. 6 are also possible.

Figure 7:
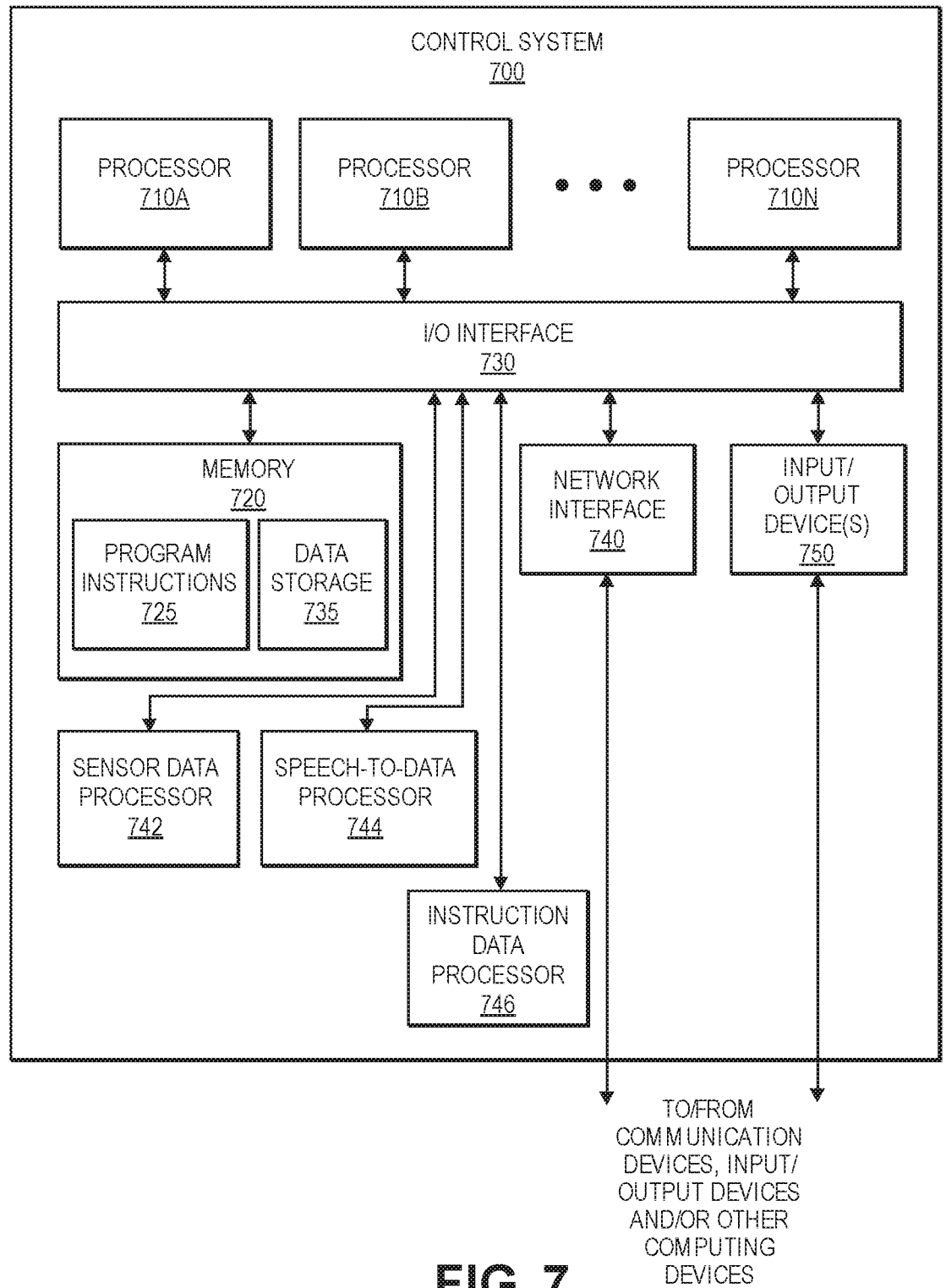
FIG. 7 is a block diagram illustrating an example control system, in accordance with disclosed implementations.

FIG. 7 is a block diagram illustrating an example control system 700, in accordance with disclosed implementations.

Various operations of a control system or controller, such as those described herein, may be executed on one or more computer systems, and/or interacting with various other computers, systems, or devices in association with airports, airfields, airstrips, aerodromes, or similar locations, according to various implementations. For example, the control system discussed above may function and operate on one or more computer systems. One such control system is illustrated by the block diagram in FIG. 7. In the illustrated implementation, a control system 700 includes one or more processors 710A, 710B through 710N, coupled to a non-transitory computer-readable storage medium 720 via an input/output (I/O) interface 730. The control system 700 further includes a network interface 740 coupled to the I/O interface 730, and one or more input/output devices 750. In some implementations, it is contemplated that a described implementation may be implemented using a single instance of the control system 700 while, in other implementations, multiple such systems or multiple nodes making up the control system 700 may be configured to host different portions or instances of the described implementations. For example, in one implementation, some data sources or services (e.g., related to portions of automated air traffic control systems or processes, etc.) may be implemented via one or more nodes of the control system 700 that are distinct from those nodes implementing other data sources or services (e.g., related to other portions of automated air traffic control systems or processes, etc.).

In various implementations, the control system 700 may be a uniprocessor system including one processor 710A, or a multiprocessor system including several processors 710A-710N (e.g., two, four, eight, or another suitable number). The processors 710A-710N may be any suitable processor capable of executing instructions. For example, in various implementations, the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the control system 700. Generally speaking, a non-transitory, computer-readable storage medium may include storage media or memory media such as magnetic or optical media, e.g., disk or CD/DVD-ROM, coupled to the control system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the control system 700 and other devices attached to a network, such as other control systems, computer systems, various types of sensors, aerial vehicles, aerial vehicle communication systems, unmanned aerial vehicle control systems, human pilots of manned aerial vehicles, or between nodes of the control system 700. In various implementations, the network interface 740 may support communication via wired or wireless general data networks, such as any suitable type of wireless, radio, cellular, satellite, or other types of communication or network technologies.

Input/output devices 750 may, in some implementations, include one or more displays, projection devices, audio input/output devices, keyboards, keypads, touchpads, scanning devices, imaging devices, sensors, voice or optical recognition devices, or any other devices suitable for entering or retrieving data by one or more control systems 700. Multiple input/output devices 750 may be present in the control system 700 or may be distributed on various nodes of the control system 700. In some implementations, similar input/output devices may be separate from the control system 700 and may interact with one or more nodes of the control system 700 through a wired or wireless connection, such as over the network interface 740.

As shown in FIG. 7, the memory 720 may include program instructions 725 that may be configured to implement one or more of the described implementations and/or provide data storage 735, which may comprise various tables, data stores and/or other data structures accessible by the program instructions 725. The program instructions 725 may include various executable instructions, programs, or applications to facilitate sensor data processing, flight data processing, speech-to-data (and data-to-speech) processing, instruction data processing, control and coordination of operations of one or more aerial vehicles, etc. The data storage 735 may include various data stores for maintaining data related to systems, operations, or processes described herein, such as one or more runways associated with airfields, one or more aerial vehicles, various types of sensors, sensor data, sensor data processing techniques and algorithms, speech or audio data, speech-to-data (and data-to-speech) processing techniques and algorithms, instruction data, instruction data processing techniques and algorithms, etc.

The control system 700 may also include a sensor data processor 742. For example, the sensor data processor 742 may utilize various types of sensor data processing techniques or algorithms, such as radar, LIDAR, imaging, infrared, acoustic, or other data processing techniques or algorithms. In addition, the sensor data processor 742 may receive sensor data from one or more sensors associated with runways of airfields, process the sensor data using one or more sensor data processing algorithms, and determine one or more characteristics of aerial vehicles based at least in part on the sensor data. Further, the sensor data processor 742 may also receive flight data from one or more aerial vehicles proximate runways of airfields, process the flight data using one or more data processing algorithms, and determine one or more characteristics of aerial vehicles based at least in part on the flight data.

The control system 700 may also include a speech-to-data (or data-to-speech) processor 744. For example, the speech-to-data processor 744 may utilize various types of speech recognition and/or speech synthesis techniques or algorithms, or other audio data processing techniques or algorithms. In addition, the speech-to-data processor 744 may receive speech or audio data from one or more aerial vehicles proximate runways of airfields, process the speech or audio data using one or more audio data processing algorithms, and determine one or more characteristics of aerial vehicles based at least in part on the speech or audio data. Further, the speech-to-data processor 744 may also receive instruction data from an instruction data processor 746, process the instruction data using one or more audio data processing algorithms, and determine one or more audio flight instructions for aerial vehicles based at least in part on the instruction data.

The control system 700 may further include an instruction data processor 746. For example, the instruction data processor 746 may utilize various types of logic, programming, or rules to determine instructions to control and coordinate operations of one or more aerial vehicles. In addition, the instruction data processor 746 may receive one or more characteristics of aerial vehicles determined based on sensor data and/or flight data, process the one or more characteristics using various types of logic, programming, or rules associated with coordination of aerial vehicle operations, and determine instruction data for aerial vehicles based at least in part on the one or more characteristics.

Although FIG. 7 illustrates each of the processors 742, 744, 746 as individual processors, in other example embodiments, one or more of the processors 742, 744, 746 may be at least partially or fully combined or integrated with each other, and/or may be at least partially or fully combined or integrated with one or more other processors 710 of the example control system 700 or other control systems or devices.

Those skilled in the art will appreciate that the control system 700 is merely illustrative and is not intended to limit the scope of implementations. In particular, the control system and devices may include any combination of hardware or software that can perform the indicated functions, including computers, network devices, internet appliances, control devices, etc. The control system 700 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An automated air traffic control system, comprising:
   a first set of radar sensors positioned at a first end of a runway, the first set of radar sensors including:
      a first radar sensor oriented towards a first approach corridor associated with the first end of the runway; and
      a second radar sensor oriented towards the runway from the first end of the runway;
   a second set of radar sensors positioned at a second end of the runway opposite the first end, the second set of radar sensors including:
      a third radar sensor oriented towards a second approach corridor associated with the second end of the runway; and
      a fourth radar sensor oriented towards the runway from the second end of the runway; and
   a controller in communication with each of the first set of radar sensors and the second set of radar sensors, the controller configured to at least:
      receive, from a first unmanned aerial vehicle (UAV) on the runway, flight data associated with the first UAV;
      receive, from at least one of the second radar sensor or the fourth radar sensor, sensor data associated with the first UAV on the runway;
      receive, from a second UAV within at least one of the first approach corridor or the second approach corridor, flight data associated with the second UAV;
      receive, from at least one of the first radar sensor or the third radar sensor, sensor data associated with the second UAV within at least one of the first approach corridor or the second approach corridor;
      process the flight data and the sensor data associated with the first and second UAVs;
      determine first instruction data for the first UAV and second instruction data for the second UAV based at least in part on the flight data and the sensor data associated with the first and second UAVs;
      transmit the first instruction data to the first UAV; and
      transmit the second instruction data to the second UAV.

2. The automated air traffic control system of claim 1, wherein the flight data associated with the first UAV includes at least one of identification, position, orientation, altitude, heading, speed, flight plan, or remaining flight range associated with the first UAV; and
   wherein the flight data associated with the second UAV includes at least one of identification, position, orientation, altitude, heading, speed, flight plan, or remaining flight range associated with the second UAV.

3. The automated air traffic control system of claim 1, wherein the sensor data associated with the first UAV includes at least one of identification, position, orientation, altitude, range or distance to the first UAV, heading, or speed associated with the first UAV; and
   wherein the sensor data associated with the second UAV includes at least one of identification, position, orientation, altitude, range or distance to the second UAV, heading, or speed associated with the second UAV.

4. The automated air traffic control system of claim 1, wherein the first instruction data to the first UAV includes at least one of identification, position, orientation, altitude, heading, speed, flight plan, flight pattern, turns, reroutes, delays, takeoff instructions, landing instructions, or taxiing instructions associated with the first UAV; and
   wherein the second instruction data to the second UAV includes at least one of identification, position, orientation, altitude, heading, speed, flight plan, flight pattern, turns, reroutes, delays, takeoff instructions, landing instructions, or taxiing instructions associated with the second UAV.

5. A system, comprising:
a first sensor positioned at a first lengthwise end of a runway and having a first field of view oriented towards the runway;
a second sensor positioned at a second, opposite lengthwise end of the runway and having a second field of view oriented towards the runway;
wherein the first field of view of the first sensor and the second field of view of the second sensor are oriented towards each other; and
a controller in communication with each of the first sensor and the second sensor, the controller configured to at least:
receive, from at least one of the first sensor or the second sensor, sensor data associated with an aerial vehicle in proximity to the runway;
process the sensor data associated with the aerial vehicle;
determine instruction data for the aerial vehicle based at least in part on the sensor data associated with the aerial vehicle; and
transmit the instruction data to the aerial vehicle.

6. The system of claim 5, wherein the first sensor is further oriented towards a second approach corridor associated with the second end of the runway; and
wherein the second sensor is further oriented towards a first approach corridor associated with the first end of the runway.

7. The system of claim 5, further comprising:
a third sensor positioned at the first end of the runway and oriented towards a first approach corridor associated with the first end of the runway; and
a fourth sensor positioned at the second end of the runway and oriented towards a second approach corridor associated with the second end of the runway.

8. The system of claim 5, wherein the aerial vehicle comprises an unmanned aerial vehicle; and
wherein the controller is further configured to:
receive, from the unmanned aerial vehicle in proximity to the runway, flight data associated with the unmanned aerial vehicle; and
process the flight data associated with the unmanned aerial vehicle; and
wherein the instruction data for the unmanned aerial vehicle is further determined based at least in part on the flight data associated with the unmanned aerial vehicle.

9. The system of claim 5, wherein the aerial vehicle comprises a manned aerial vehicle; and
wherein the controller is further configured to:
receive, from the manned aerial vehicle in proximity to the runway, flight data associated with the manned aerial vehicle; and
process the flight data associated with the manned aerial vehicle;
wherein the instruction data for the manned aerial vehicle is further determined based at least in part on the flight data associated with the manned aerial vehicle.

10. The system of claim 9, wherein receiving flight data from the manned aerial vehicle further comprises receiving audio flight information from the manned aerial vehicle; and
wherein processing the flight data associated with the manned aerial vehicle further comprises converting the audio flight information to the flight data associated with the manned aerial vehicle.

11. The system of claim 9, wherein determining the instruction data for the manned aerial vehicle further comprises converting the instruction data to audio flight instructions for the manned aerial vehicle; and
wherein transmitting the instruction data to the manned aerial vehicle further comprises transmitting the audio flight instructions to the manned aerial vehicle.

12. The system of claim 5, wherein the first and second sensors comprise single lobe, radar sensors.

13. The system of claim 5, wherein at least one of the first sensor or the second sensor comprises at least one of a radar sensor, a LIDAR (light detection and ranging) sensor, an imaging sensor, an infrared sensor, or an acoustic sensor.

14. The system of claim 5, wherein the sensor data associated with the aerial vehicle includes at least one of identification, position, orientation, altitude, range or distance to the aerial vehicle, heading, or speed associated with the aerial vehicle.

15. The system of claim 5, wherein the instruction data to the aerial vehicle includes at least one of identification, position, orientation, altitude, heading, speed, flight plan, flight pattern, turns, reroutes, delays, takeoff instructions, landing instructions, or taxiing instructions associated with the aerial vehicle.

16. The system of claim 5, wherein the controller is further configured to:
receive, from at least one of the first sensor or the second sensor, second sensor data associated with a second aerial vehicle in proximity to the runway;
process the second sensor data associated with the second aerial vehicle; and
determine second instruction data for the second aerial vehicle based at least in part on the sensor data associated with the aerial vehicle and the second sensor data associated with the second aerial vehicle; and
transmit the second instruction data to the second aerial vehicle;
wherein the instruction data for the aerial vehicle is further determined based at least in part on the second sensor data associated with the second aerial vehicle.

17. A method, comprising:
receiving, by a controller from at least one of a first sensor or a second sensor, sensor data associated with an aerial vehicle in proximity to a runway, the first sensor positioned at a first lengthwise end of the runway and having a first field of view oriented towards the runway, and the second sensor positioned at a second, opposite lengthwise end of the runway and having a second field of view oriented towards the runway, the first and second fields of view of the first and second sensors being oriented towards each other;
processing, by the controller, the sensor data associated with the aerial vehicle;
determining, by the controller, instruction data for the aerial vehicle based at least in part on the sensor data associated with the aerial vehicle; and
transmitting, by the controller, the instruction data to the aerial vehicle.

18. The method of claim 17, further comprising:
determining, by the controller, that the aerial vehicle is a manned aerial vehicle;
responsive to determining that the aerial vehicle is a manned aerial vehicle,
receiving, by the controller, audio flight information from the manned aerial vehicle;

converting, by the controller, the audio flight information to flight data associated with the manned aerial vehicle; and processing, by the controller, the flight data associated with the manned aerial vehicle.

19. The method of claim 18, wherein, further responsive to determining that the aerial vehicle is a manned aerial vehicle, the instruction data for the aerial vehicle is further determined based at least in part on the flight data associated with the aerial vehicle; and the method further comprising:

converting, by the controller, the instruction data to audio flight instructions associated with the manned aerial vehicle;

wherein transmitting the instruction data to the aerial vehicle further comprises transmitting, by the controller, the audio flight instructions to the aerial vehicle.

20. The method of claim 17, further comprising:

receiving, by the controller from at least one of the first sensor or the second sensor, second sensor data associated with a second aerial vehicle in proximity to the runway;

processing, by the controller, the second sensor data associated with the second aerial vehicle;

determining, by the controller, second instruction data for the second aerial vehicle based at least in part on the sensor data associated with the aerial vehicle and the second sensor data associated with the second aerial vehicle; and transmitting, by the controller, the second instruction data to the second aerial vehicle;

wherein the instruction data for the aerial vehicle is further determined based at least in part on the second sensor data associated with the second aerial vehicle.

* * * * *